United States Patent Office 3,522,214
Patented July 28, 1970

3,522,214
PROCESS AND APPARATUS FOR POLYMERIZING LIQUIDS
Jack E. Crawford, Beaumont, Tex., and Ralph W. Edwards, Metuchen, Edward D. Henze, Bridgewater Township, Somerset County, and William C. L. Wu, East Brunswick, N.J., assignors to Mobil Oil Corporation, a corporation of New York
Filed Apr. 13, 1967, Ser. No. 630,745
Int. Cl. C08g *17/003*
U.S. Cl. 260—75
13 Claims

ABSTRACT OF THE DISCLOSURE

Viscous liquids, such as polyethylene terephthalate prepolymer, are polymerized to high molecular weight polymers while being transported through one or more heated reaction chambers by closely intermeshed, parallel, horizontal, counter-rotating screws and distributed on their outwardly moving, upper surfaces in layers thin enough for the elimination of gaseous products without excessive frothing under subatmospheric pressures. A small nip clearance between the intermeshing screw flights provides a wiping action that prevents accumulating material thereon and exposes fresh surfaces of the polymerizing liquid as well as regulating the thickness of the layer thereof carried upwardly by each screw even when great increases in viscosity occur during polymerization. Gastight seals between adjacent chambers are obtained by completely enclosing the intermeshing screws in close fitting barrels or tunnels and providing restricted orifices therein whereby the enclosed screw sections become completely filled with the polymerizing material.

BACKGROUND OF THE INVENTION

Field of the invention

This invention relates to a method and apparatus for the treatment of liquids wherein an action of a gaseous material at the gas-liquid interface is involved. More particularly, it relates to the treatment with or removal of a gaseous material from the surface of a viscous liquid material; and one preferred specific embodiment is concerned with the continuous polycondensation of low order polymers of polyethylene terephthalate to high molecular weight products.

Description of the prior art

Many techniques and types of apparatus have been suggested for contacting liquids with gases or removing gases from liquids with varying degrees of success. It is relatively easy to obtain uniform treatments of this nature with many materials, but more difficulty is encountered with others especially where the treatment involves the rapid evolution of gases or vapors from a liquid of changing viscosity under subatmospheric pressures and high temperatures as is the case in the production of fiber and tire cord grades of polyethylene terephthalate of high molecular weight from "prepolymer." The latter term is used to describe mixtures of low order polymers or oligomers of polyethylene terephthalate, often containing a few percent of monomeric bis-2-hydroxyethyl) terephthalate, having an average degree of polymerization of the range of about 2 to 15. In such polycondensation reactions, it is known that a uniform residence time for all portions of the material is desirable in continuous production and that back mixing or intermixing of low molecular weight material with higher molecular weight material is undesirable. In addition, it is known that the release of ethylene glycol formed in the reaction is facilitated by exposing a large surface area, that is a large gas-liquid interface, of the reaction mixture and also in carrying out the reaction in several zones under progressively diminishing subatmospheric pressures.

A wide variety of agitators including single screw conveyors, rotating helical ribbons, adjoining parallel reels, and counterrotating intermeshing paddle wheels and blades have been proposed for providing intimate contact between liquids and gases in various types of vessels. In some instances, a wiping action is mentioned or seems to be inherent in the operation, but it does not appear that any such apparatus provides a self-cleaning wiping action for all equipment surfaces exposed to the liquid undergoing treatment.

In the production of high molecular weight polyethylene terephthalate from prepolymer, Pierce et al. Pat. No. 3,057,702 describes apparatus for transporting the reacting material and generating a high surface area during the reaction by means of a rotating shaft extending across a tilted polymerization reactor and carrying short discontinuous screw flights or sections interspersed with screens for subdividing large polymer agglomerates. To increase the surface generation without extending the length of the vessel, it is indicated that the vessel may be widened to permit the use of two such rotating shafts with intermeshing screw sections, but there is no indication of the direction of rotation or the clearance between screw flights. The patentees also contemplate that the reactor may be divided into a plurality of compartments operating under diminishing pressures by means of dams or weirs cooperating with spaced upper partitions to form liquid seals at the ends of the compartments; however, it is apparent that the differences in pressure between adjacent compartments is severely limited by the small pressure heads obtainable with these liquid seals unless a reactor of inordinate size is employed. The downward tilt of the reactor maintains a flow of material therethrough and the several screw flights are accordingly immersed at varying depths in the liquid ranging up to almost complete immersion therein.

Vodonik Pat. No. 2,758,915 describes a somewhat similar reactor wherein counterrotating intermeshing flat solid discs with the spacing between adjacent discs increasing from ⅝ to 1⅛ inch are provided as an agitating means to generate a large exposed surface area and also to exert some pumping action. Although the discs are shown in the drawings as rotating outwardly at the top, it is not indicated that this provides any advantage over inward counterrotation. There is recognition of a tendency of the more viscous polymeric material to stick to the surfaces of the solid discs thus produce repeated exposure of the same polymeric material, and it is proposed to overcome this difficulty by mounting series of open spoked wheels or grids between the discs on the rotating shafts. In the case of reactors tilted upward toward the discharge end, it is indicated that a number of short sections of intermeshing screws may be installed in several positions along the parallel shafts in order to improve the pumping action, but the clearance between such screw flights is not indicated.

SUMMARY OF THE INVENTION

In accordance with this invention, there are provided a continuous process and apparatus for the treatment of a liquid involving the action of a gaseous material at a gas-liquid interface which comprises continuously distributing and exposing said liquid at a suitable treating temperature in the vapor space of a confined zone as a thin layer of controlled maximum thickness on the outwardly and oppositely rotating upper surfaces of a pair of substantially horizontal, parallel, closely intermeshed screws and continuously transporting said liquid through said zone at a predetermined rate by the counterrotation of said screws while partially immersed in said liquid to a depth not substantially exceeding the radii of said screws.

Other aspects of the invention relate to its particular utilization in the continuous polymerization of liquid materials which produce vaporizable or gaseous materials during polymerization, particularly highly viscous polymerizing materials, and a specific embodiment thereof involving the polycondensation of lower polymers of polyethylene terephthalate to high molecular weight polymers.

Further features of the invention include maintaining the nip clearance between the intermeshing screw flights small enough to control the maximum thickness of the distributed layer of liquid thereon, subjecting substantially all equipment surfaces in contact with viscous liquids to a continual wiping action, the location of confining walls and vapor spaces relative to said screws, the provision of a plurality of sequential reaction zones and the manner in which the liquid material is transferred between zones or discharged while maintaining gas-tight seals. Still other features of the invention as well as various objects and advantages obtainable with this invention will be apparent to those skilled in the art upon consideration of the accompanying drawings and the detailed disclosure hereinafter.

The term "liquid" is employed broadly herein to designate not only normally liquid materials but also to include semi-solid and solid materials (e.g., of a plastic nature) which are capable of flow at elevated temperatures under substantial pressures.

These illustrations are partly schematic and parts have been broken away and conventional accessories omitted for greater clarity.

DESCRIPTION OF SPECIFIC EMBODIMENTS

Figure 1:
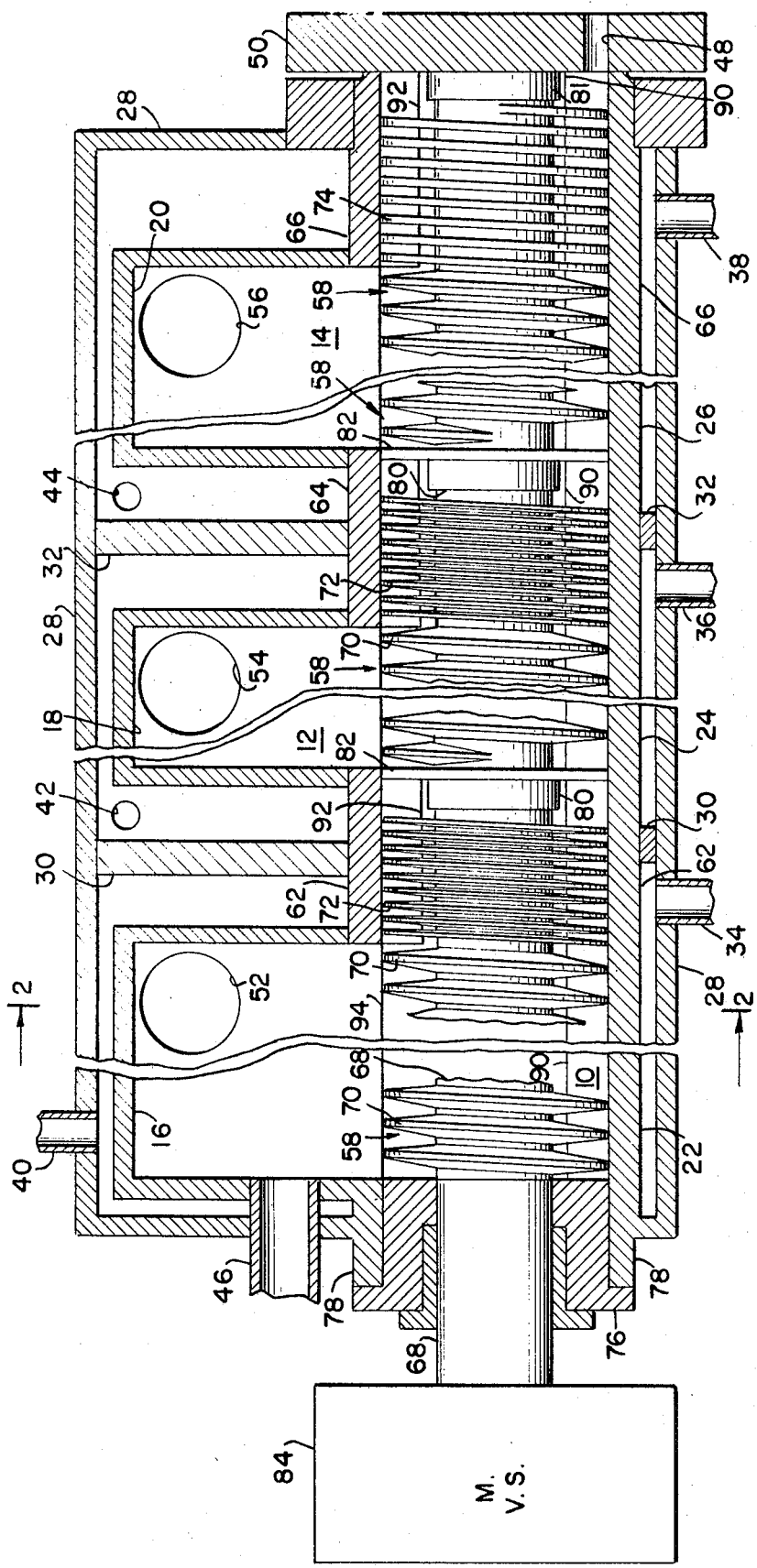
FIG. 1 is a longitudinal sectional elevation taken on the line 1—1 of FIG. 2 of one embodiment of a three-chamber reactor according to the invention.

Upon referring to the drawings, it will be observed in FIG. 1 that the reactor is divided into three separate reaction zones, namely an initial reaction chamber 10, an intermediate chamber 12 and a final chamber 14. The upper portions of these chambers contain vapor spaces enclosed within the domes 16, 18 and 20 respectively while their lower walls 22, 24 and 26, respectively, are overlapping twin barrel sections as will be apparent upon reference to FIG. 2. All three chambers are almost completely surrounded by a jacket 28 through which a fluid heating or cooling medium, such as hot Dowtherm, may be circulated to control the temperature in the reaction zones. This heating jacket is desirably divided into three zones by means of the partitions 30 and 32. Inlet connections 34, 36 and 38, respectively, are provided for the admission of the heat exchange fluids at the same or different temperatures and these fluids may be wtihdrawn through the upper connections 40, 42 and 44, respectively; or the flow may be reversed when utilizing condensing vapors as the indirect heat exchange media.

Figure 2:
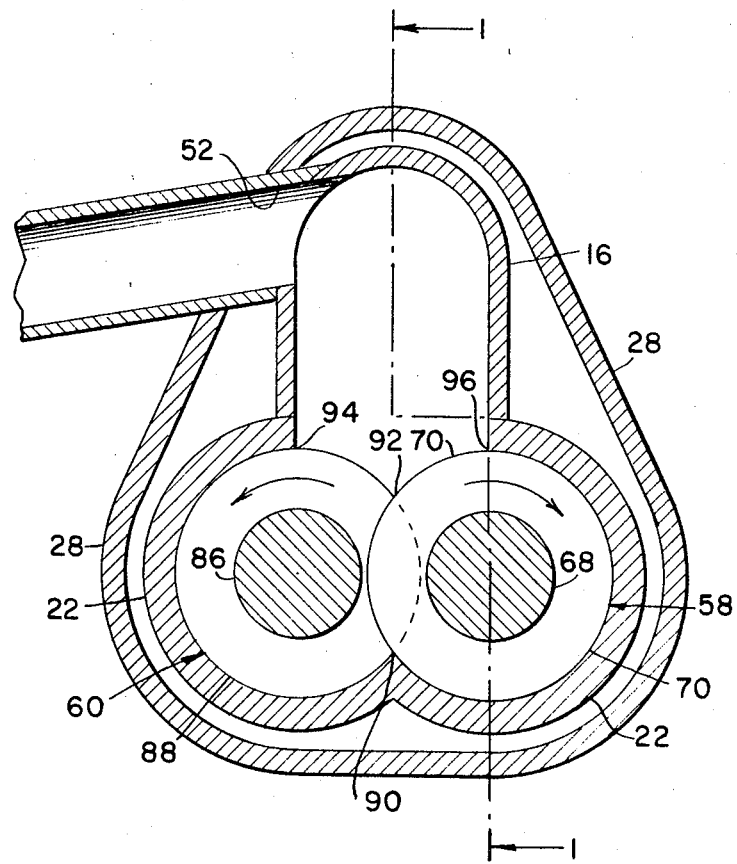
FIG. 2 is a transverse sectional elevation of the same reactor taken on the plane of the line 2—2 of FIG. 1.

The prepolymer or other liquid to be treated is introduced through the supply line 46 onto the first flights of the screws described hereinafter and the product is discharged through the opening 48 (schematically shown) in the end plate 50 which is removably fastened to the end of the reactor. The chambers are provided with separate gas transfer conduits 52, 54 and 56, respectively, communicating with their vapor spaces. When they are employed for removing a condensable vapor, it is desirable to have these conduits slope downward away from the vapor domes 16, etc. to drain any condensate away from the reaction chamber as shown in FIG. 2. In addition, it is desirable to either heavily insulate these conduits or better still to surround them with heating jackets, whenever they are carrying material that tends to solidify therein upon condensing.

Two counterrotating, intermeshing screws 58 and 60 extend practically the entire length of the reactor through the barrel sections 22, 24 and 26 which are open at the top and also through the peripherally enclosed barrel sections or passageways 62, 64 and 66. Each screw comprises a shaft bearing a plurality of screw flight sections that rotate with the shaft and extend along the entire length of the reactor. These screws may be formed as integral units by machining single pieces of rod stock of suitable diameter. However, it is usually preferable to individually machine the various screw sections described hereinafter from separate lengths of heavy walled cylindrical stock having a bore matching that of the screw shaft and then rigidly mount these flights on the shaft by means of keys engaging keyways in the shaft and in the screw flight. Maintenance and repairs are both easier and less costly when screws of composite construction are utilized.

Thus, screw 58 comprises the shaft 68 bearing three threaded distributing sections 70 each extending for the length of the reaction chamber in which it is located and having a deep V profile of relatively small pitch or lead between individual screw flights or threads, two sealing screw sections 72 of the same diameter and depth but a distinctly smaller pitch located in the closed barrels or passageways 62 and 64 as well as the discharge screw flight section 74 located in the closed discharge barrel section 66. The pitch of the discharge flight 74 is also considerably smaller than that of flights 70 but its outside diameter and depth of grooves usually remain the same.

The screw 58 is desirably supported at four points along the length of the reactor, including a stuffing box or gland 76 which is fastened in a collar 78 protruding from the feed end of the apparatus, two bearings 80 affixed to the supporting rings 82 in each of the closed barrel passages 62 and 64, respectively, and another bearing 81 affixed to end plate 50. It is contemplated that the exterior of stuffing box 76 may be enclosed within a vacuum jacket to minimize or eliminate any possible leakage of the atmosphere into reaction chamber 10 in instances where that chamber is operating under a high vacuum.

Bearing support rings 82 are of openwork construction and they are removably fitted into the dual barrel sections 62 and 64 in a manner that prevents rotation of the rings with the shafts. However, the one or more openings (not shown) of restricted size in each of the annular support rings 82 provide considerably less cross-sectional area than the ends of the screw flights for the passage of the liquid undergoing treatment; hence, these rings function as orifice plates and create a resistance to flow that backs up the liquid in the passageways 62 and 64 which enclose the entire unmeshed peripheries of screw sections 72 with very little clearance. This action completely fills at least several of the individual flights of the pairs of screw sections 72 adjacent to rings 82 with the liquid, and this provides a dynamic liquid seal against the travel of gases and vapors between the three reaction chambers even under the influence of a substantial differential in static pressure while permitting the liquid to flow from one chamber to the next.

The screw 58 is driven by a variable speed device 84 as schematically shown in FIG. 1, and this apparatus may typically include an electric motor, a variable speed transmission and reduction gearing for rotating the shaft 68 at speeds of the order of 1 to 40 revolutions per minute or more. This screw is equipped with left hand flights and it rotates in the clockwise direction when viewed from the feed end of the apparatus as in FIG. 2, (i.e., looking in the direction of travel of the liquid material therethrough) to continually transport the material undergoing treatment from left to right in the reactor shown in FIG. 1.

The other screw 60 is similar in all respects to screw 58 except that it is equipped with right hand screw flights and rotated counterclockwise as viewed in FIG. 2 at the same speed by suitable gearing within the driving mechanism 84. Each screw flight section on screw 58 has a matching counterpart of the same diameter, profile, length, location, supporting means and speed of rotation but of opposite thread orientation on screw 60. As may be observed in FIG. 2, the shaft 86 of screw 60 bears a flight section 88 which is in deep and close intermeshing engagement with flight section 70 on the other screw. This intermsehing or engagement of the screw flights extend from a lower point closely adjacent to the ridge 90 of the bottom wall of the twin barrel section up to a point adjacent the level of the downwardly projecting rib 92 of the enclosed barrel section 62; and the nip or minimum clearance between flights is in the plane extending through the axes of the two screws 68 and 86. The apparatus is designed with a nip clearance between the intermeshing screw flights appropriate for the particular process and the liquid undergoing treatment. In the polycondensation of polyethylene terephthalate prepolymer, good results have been obtained with a clearance of $\frac{1}{16}$ inch between the screw flights in all intermeshed sections which limits the exposed liquid film thickness to a maximum of between $\frac{1}{32}$ and about $\frac{1}{16}$ inch depending on the tendency toward extrusion of extra material upward through the nip of the flights, which upward extrusion tendency is probably influenced by such factors as the rotary speed of the screws and by the level and viscosity of the liquid.

The clearance between all screw flights and the barrel sections partly or completely surrounding them is preferably kept as small as possible (e.g., typically within the range of about 0.001 to 0.020 inch) in order to provide a strong wiping action and substantially eliminate back flow and stagnation of the liquid during treatment.

The small nip and barrel clearances are an important feature of this invention as they insure that substantially all equipment surfaces in contact with the liquid are continually subjected to a wiping action that prevents any significant accumulation and stagnation of polymeric material.

The screw shafts 68 and 86 are aligned parallel to one another in a substantially horizontal plane. While one end of the apparatus may be raised or lowered somewhat to incline the screws somewhat, there is usually no advantage in this practice and a tilt sufficient to raise the liquid level above the screw axes over any substantial length of the distributing screw flights in the reaction chambers is generally undesirable. In addition, although it is contemplated that the two screws may be arranged in such manner that their shafts converge or diverge slightly toward the discharge end of the apparatus in order to provide decreasing or increasing clearance between the screw flights as the material undergoing treatment advances through the reaction zones, it is thought that any advantages gained thereby would seldom, if ever, justify the extra costs involved in the construction and maintenance of such a reactor.

It is also contemplated that different clearances may be utilized between the intermeshing screw flights in different reaction chambers by machining each pair of screw flight sections 70 and 88 to different dimensions in order to expose liquid layers of different thickness in the various chambers. However, this feature is not regarded as necessary in most applications and it may lead to further complications in requiring different diameters for the barrel section in each reaction zone and render assembly and disassembly of the apparatus more difficult.

A substantial area of the screw flights adjacent to their intermeshing junction or nip is exposed to the vapor space for the full length of each reaction chamber. As shown in FIG. 2, a quadrant of each screw is thus exposed in the area extending from the junction 94 of the walls of vapor dome 16 and of barrel 22 on one side down to the nip in the plane of the screw axes and up to the junction 96 of dome and barrel on the other side. It will be appreciated that the width of the dome 16 may be increased or decreased in order to meet the needs of any particular process in designing the apparatus, thereby increasing or decreasing the distance between junctions 94 and 96 and the width of the screw sectors thus exposed in the vapor space.

In operating the specific apparatus embodiment illustrated in accordance with the principles of the present process, a fluid heat exchange medium is introduced into the inlet connections 34, 36 and 38 of the jacket 28 to bring each of the three chambers 10, 12 and 14 to the desired temperature and the counterrotation at the selected speed of screws 58 and 60 is started by actuating the drive mechanism 84. Suction is applied to the inlet connections 52, 54 and 56 using suitable devices, such as vacuum pumps or steam jet eductors (not shown), which may be individually operated or jointly connected. If necessary, the reaction chambers may be purged with an inert gas, such as nitrogen, admitted through inlet connections (not shown). Alternatively, if it is desired to treat a liquid with a gas or vapor, the treating gas may be introduced through the gas transfer conduits 52, 54 and 56. Finally, a stream of the liquid undergoing treatment is introduced through inlet connection 46 in the reaction chamber 10 at a suitable rate of flow. In general, it is desirable to regulate this flow and the speed of the screws in such manner that the liquid level in the reaction chambers does not rise above the axes of the screws 58 and 60 in order to obtain the full benefits of the present processing technique relative to the exposure of only a thin layer or film of regulated thickness of the liquid in the vapor spaces. In some instances, it may be desirable to install the inlet 46 beneath the screws.

The liquid undergoing treatment is transported through the three chambers sequentially by the rotation of the screws which also simultaneously expose a thin film of the liquid in the bottom of the vapor space. As each of the screws rotates through a pool of liquid at the bottom of the barrel section 22, it picks up a layer of liquid of uncontrolled thickness which may vary considerably in thickness depending chiefly upon the viscosity of the liquid at that moment under the prevailing conditions. However, upon reaching the nip of the intermeshing screw flights, the small nip clearance between the screw flights may exert a positive regulating or controlling action in which the maximum thickness of the film or layer of liquid on the screw flights emerging from the nip is restricted in the manner described earlier.

In the case of liquids of substantialy viscosity, the intermeshing also produces a wiping or rubbing action that provides a continuing renewal or changing of the liquid surface exposed to the vapor space. This surface renewal is particularly important in facilitating the release of gas or vapor from viscous liquids as this evolution is predominantly a surface effect, and there is a substantial tendency of viscous liquids to retain the same gas-liquid interface even during substantial agitation when no wiping action is employed. It is also to be noted that the close nip engagement provides a repetitive wiping action around the entire profile of each flight or thread including the bottoms of all grooves which together with the wiping of the peripheries of the flights along substantially the entire wall area of the barrels provides a continual cleaning of essentially all apparatus surfaces in contact with the viscous liquids. Accordingly, significant accumulation of deposits of stagnant material with consequent deterioration in physical properties and/or color of the product is effectively eliminated. Further, plugging of the equipment is unlikely to happen and shutdowns for repairs and cleaning are minimized.

As each portion of the liquid reaches the end of the initial distributing screw flight sections 70 and 88 and enters the completely enclosed passageway 62, it is then transported by the flight section 72 of substantially smaller pitch and its mating right hand flight. As mentioned earlier, at least several flights or threads of these low pitch screw sections become completely filled with the liquid and thus provide a dynamic seal against vapor leakage as the liquid is pumped through the barrel section 62 into chamber 12 through openings (not shown) in the twin bearing supports 82. While a similar effect may be obtained with screw flights of the same pitch as the distributing flights, lower pitch flights exert a greater pumping action that is often preferable. Thus, passageway 62 and the liquid-filled screw flights therein prevent the passage of gaseous material between chambers 10 and 12 even when these chambers are operating under substantially different static vapor pressures; however, the liquid material is pumped steadily through the passage 62 at a constant rate of flow.

A similar dynamic liquid seal is maintained in the passageway 64 to prevent any significant gas or vapor leakage even when the reaction chamber 14 is maintained at a considerably different pressure from that of chamber 12.

The distributing screw flight sections 70 and 88 perform the same functions of transporting the liquid and distributing it as thin film in each of the several reaction chambers. Control of the thickness of the distributed film on the upper surfaces of the screw flight continues even when there is a great increase in viscosity as is often the case with polymerizing liquids. By thus regulating the thickness of the exposed liquid film throughout all of the reaction chambers, the undesirable frothing or foaming commonly encountered in the release of gaseous material from viscous liquids are eliminated or at least minimized here. Excessive foaming is conductive to the entrainment of excessive amounts of the liquid which is either lost or recovered at extra cost. Moreover, polymeric material entrained in the vapor or sublimed is very likely to plug the vapor removal lines and recovery equipment with solid deposits.

The treated liquid is discharged from the reactor through the completely enclosed barrel section 66 by means of the screw section 74 and an intermeshing right hand screw section on the adjoining shaft 86 which force the product through the opening 48 which may desirably be located slightly above the barrel ridge 90 rather than in the position schematically shown in FIG. 1. Since a considerably greater pressure is required to expel the product through the small discharge opening 48 than for transporting the liquid through the reactor, it is often preferable to employ flights of rectangular profile within the barrel section 66 especially for handling liquids of high viscosity. When producing polyethylene terephthalate of fiber or tire-cord grades it may be desirable to connect a positive displacement pump, such as a precision gear pump, to the discharge outlet 48 in order to maintain a steady flow therethrough. Unless a steady and suitable discharge rate is maintained, the product liquid tends to back up in reaction chamber 14 and flood the upper surfaces of the screws therein; and, as indicated earlier, this is undesirable in nullifying the desired action of the intermeshing screws in distributing an even layer of controlled thickness on the upper surfaces of the screws.

From the foregoing, it will be apparent to those skilled in the art that the present process provides superior results in distributing a layer of liquid of controlled thickness at the interface exposed in the vapor spaces with relatively minor variations in film thickness even when extreme changes in viscosity occur during the reaction; that substantially all surfaces in contact with the liquid are subjected to constant wiping action, and that back mixing is essentially eliminated. Such results are not obtainable with screws rotating in the same direction or with screws which have their upper surfaces rotating inwardly toward one another rather than outwardly as in the present invention. In addition, the screws described here extend the entire length of the reaction chambers in performing both distributing and transporting functions in a steady manner instead of comprising merely short fight sections for exerting occasional pumping action.

The characteristics of the various screw flights are subject to considerable variation. In general, the distributing and transporting screw sections 70 and the sealing and pumping flight sections 72 and 74 may have any flight profile, such as a V or rectangular profile, which carries an angular edge into close proximity to the walls of the surrounding barrel sections to minimize or eliminate back-flow and the adherence of viscous liquid to the barrel walls. Usually a profile in the form of a V terminating short of a sharp point is preferred for the distribution flights 70 and for light pumping in the enclosed flights 72 while an equally deep rectangular profile is often better for the heavier pumping action required in discharge flight section 74. Deep flight grooves are desirable for providing maximum surface exposure of the liquid in combination with maximum production capacity, and the depth of these may amount to about half or more of the screw fight radius in many cases. In general, the pitch or lead of the distributing flights is desirably relatively small as, for illustration, about 5 to 25% of the maximum screw diameter. The pitch of each of the sealing and pumping flights is preferably smaller still in many instances, and usually within the range of about 3 to 15% of the screw diameter, in order to enhance the pumping action by the mechanical advantage of the reduced lead or pitch.

The nip clearance between intermeshing screw flights can vary substantially for different processes and liquids, but it is generally desirable to have a substantially uniform clearance around the entire profile of the thread or flight. It is contemplated that this clearance may be as little as 0.01 inch or even less in the treatment of some liquids of low viscosity and as much as 0.2 inch or more where liquids having extremely high viscosities are involved.

In other modifications of this invention, the reactor may contain a single reaction zone or be partitioned into 2, 4 or even more zones. Moreover, it may sometimes be desirable to employ separate reactors of such types arranged in series in a sequential process for greater flexibility. The latter arrangement permits using a different screw speed in each reactor and also different sizes of screws; moreover, it facilitates withdrawing samples of intermediate products between reaction zones for inspection and analysis.

For a further understanding of one particular embodiment of the invention involving polycondensation, reference should be had to the following example which is set forth for the purpose of illustration and not limitation of the invention.

EXAMPLE

A prepolymer charge for the polycondensation process is prepared by reacting a mixture of ethylene glycol and terephthalic acid in a 1.5:1 molar ratio which also contains 0.28% of diisopropylamine and 0.05% of antimony trioxide (based on the weight of terephthalic acid) as catalysts. This direct esterification is carried out with suitable agitation in a closed vessel at a temperature of 509° F. under a pressure of 100 lbs. per square inch gage (p.s.i.g.) for 24 minutes and then 20 p.s.i.g. for the next 15 minutes and finally the pressure is reduced to 100 mm. Hg absolute with the temperature increased to 536° F. for 15 minutes more. During the early stages, water formed during the reaction is removed in vapor form and unreacted glycol is taken overhead in the final stages.

The resulting polyethylene terephthalate prepolymer still contains the antimony trioxide which is a good polycondensation catalyst, and it has a viscosity of 4 poises at 540° F. and an interinsic viscosity (I.V.) of 0.18 as determined in dilute solution at 25° C. in a mixture of equal weights of phenol and tetrachloroethane. The estimated degree of polymerization of this material is 8; hence, its low order polymer chains contain an average of about eight repeating terephthalic acid residues interlinked by single glycoxy groups and terminating in hydroxyethyl radicals.

Alternatively, the charge may consist of a similar polyethylene terephthalate prepolymer derived from the transesterification of dimethyl terephthalate with ethylene glycol. However, the prepolymer obtained via the direct esterification of terephthalic acid with the glycol is generally preferred as the charge here because it condenses at higher rates throughout the polycondensation process and products of substantially higher molecular weight are obtainable than is the case with a starting material prepared via the transesterification route. It may be theorized that the difference in reactivity, particularly in the late stages of polycondensation, is due to the presence of a few reactive carboxyl radicals in the former charge and of a few relatively unreactive methyl end groups in the latter charge.

In the production of a fiber grade polyethylene terephthalate in a two-stage polycondensation operation, a reactor with an internal length of 88 inches is employed which is similar to that illustrated in FIG. 1 except for the omission of the intermediate reaction chamber 12 and the twin barrel passageway 64. The polyethylene terephthalate prepolymer with the viscosity characteristics specified hereinbefore is charged at a rate of 30 lbs. per hour through the inlet connection 46 onto the screws 58 and 60 in the initial chamber 10 of the reactor. All of the screw flight sections in the reactor have maximum and root diameters of 7 and 3.5 inches, respectively with nip clearances of $\frac{1}{16}$ inch and they rotate at a constant speed of 12 r.p.m. The distributing flight sections 70 and pumping flight sections 72 are constructed with slightly blunt V flight profiles with leads of 0.88 and 0.35 inch, respectively, while the discharge screw section 74 has flights of rectangular profile and a pitch of 0.56 inch. The total residence time for the passage of the polymerizing material through the reactor is estimated to be 35 minutes, and the entire reactor is maintained at a temperature of 540° F. by circulating a suitable hot liquid heating medium through the heating jackets.

No substantial pool of the incoming liquid charge is formed above the intermeshed screws in chamber 10 as the outward and opposite rotation of these screws quickly carries most of the liquid over the screw shafts 68 and 86, respectively, to form a pool within the lower sectors of the screw flights and the bottom of barrel section 22. This material contained within the lower portions of the flights is steadily advanced along the 27 inch length of the initial chamber while continually changing films of the liquid are carried up through the nip of the screws and exposed at the bottom of the vapor space in dome 16 while an absolute pressure of 5 mm. of mercury is maintained therein by the application of suction to the transfer conduit 52 for the removal of the ethylene glycol vapor released from the exposed lyiquid films on the upper surfaces screws. Initially the films of liquid in the upper sector of each screw flight may be thinner than $\frac{1}{32}$ inch, and this is desirable as it minimizes frothing in the early stages of polycondensation where the evolution of ethylene glycol vapor is quite rapid. In any event, there is a progressive and marked increase in the viscosity of the liquid as polymerization continues, and the $\frac{1}{16}$ inch nip clearance of the screws soon exerts a restrictive action upon the thickening liquid that limits the film in each screw flight emerging from intermeshing engagement to a maximum thickness in the range of $\frac{1}{32}$ to about $\frac{1}{16}$ inch.

After substantial condensation, the polymerizing liquid is pumped through the 5.5-inch long passageway by the screw sections therein directly into the 47-inch long final reaction chamber 14 in this modification of the invention. Upon entering chamber 14 through the openings in bearing supports 82, the viscous liquid is again spread as a thin layer of controlled maximum thickness on the distributing sections 70 of the counterrotating screws and further polymerized while being subjected to the constant rubbing or wiping action and continuing renewal of the exposed film surfaces. A lower subatmospheric pressure of 0.5 mm. Hg. is maintained in the final reaction zone, and more ethylene glycol is released from the polymeric material and withdrawn through the vapor discharge line 56 which is connected to a suitable vacuum source. By the time the reaction mixture reaches the 9-inch long twin barrel section 66, it has become an extremely viscous polymeric melt. Screw section 74 and its counterpart pump this product through the closed barrel section 66 and discharge channel 48 into an adjoining gear pump (not shown) which forces the melt through an extrusion die into pelletizing apparatus (not shown).

In its travel through the reactor, the level of the polymerizing liquid is below the axes of the screws in chamber 10. However, the closed barrel sections 62 and 66 including the grooves in the screw flights therein are substantially completely filled with the polymerizing material.

The polymeric product has a good color and a high molecular weight suitable for the production of textile fibers. It has a viscosity of 2200 poises at 540° F., an intrinsic viscosity (I.V.) of 0.71, an RSV of 0.8, a melting point of 258° F. and a molecular weight of about 20,000. The diethylene glycol content of this material is 1.6%, based on total glycol content, and its acid equivalent is 22. The loss of prepolymer during the polycondensation reaction amounts to only 0.5% of the weight of the charge.

In view of the striking effectiveness of the present invention in the handling of viscous materials having viscosities above about 100 poises, particularly when the viscosities approach terminal values of 10,000 or more poises, measured at reaction temperature while providing for the regulated exposure of tremendous areas of films of controlled thickness along with the continuing changing of the material at the surface of the films, there are certain advantages in employing simpler prior art condensation techniques in the early reaction stages and completing the polycondensation in a single reaction zone according to the technique of the present invention. This may be illustrated by first reacting the prepolymer of the preceding polycondensation example sequentially in three enclosed, vertical, cylindrical reaction vessels arranged in series and provided with relatively large vapor spaces, efficient conventional agitators and heating means. These vessels are each heated to 540° F. and maintained at absolute pressures of 20 mm. in the first vessel, 10 mm. in the second vessel and 5 mm. Hg in the third vessel while taking off ethylene glycol vapor overhead. The residence times are adjusted to condense the prepolymer sufficiently to raise its I.V. from 0.18 to 0.38. This intermediate condensation product, which has a viscosity of approximately 120 poises at 540° F. and a degree of polymerization of the order of 46, is then introduced into a twin screw reactor having a single reaction chamber and the polycondensation is completed to form a fiber grade polyethylene terephthalate product similar to that of the preceding example under the same reaction conditions (e.g., 0.5 mm. absolute pressure, etc.) in a single reaction zone of the same dimensions as set forth in respect to final reaction chamber 14 in the aforesaid example.

In the condensation polymerization of polyethylene terephthalate prepolymer, decreasing the subatmospheric reaction pressure increases both the reaction rate and the equilibrium polymer molecular weight. But it also produces a considerable loss of the charge overhead as a result of volatilization, foaming and entrainment of the charge with attendant difficulties resulting from the solidification of polymeric material in the vacuum lines and condensate recovery system. Losses due to entrainment and frothing are especially pronounced when a pool of the material of substantial depth is exposed to a high vacuum. In addition, the rate of catalytic polycondensation of this prepolymer is a function of the rate of polymer surface renewal or change in the surface of the exposed polymerizing liquid as well as of residence time, temperature, pressure and catalyst concentration. Further, the substantial differences in the residence times of individual polymer molecules which commonly occur in continuous polymerization processes as a result of back mixing and stagnation often produce a substantial degradation of the polymer as is apparent from an excessive acid equivalent, poor color and physical properties.

A superior product is obtainable along with the elimination or minimizing of such difficulties according to the present invention by polycondensation of this prepolymer at high reaction rates with uniform residence times by distributing the polymerizing material as a thin film of controlled thickness and exposing large areas thereof while repeatedly changing the material at the film surface as the polymerizing material is transported through a reactor at a constant rate. Improvement in the operation and results are particularly evident in high vacuum operations, especially when extremely viscous materials are in the final phase of polycondensation or polymerization. Further, the invention with its improved sealing features lends itself multistage operations which permit the low molecular weight oligomers to polymerize under a moderate vacuum with a consequent lowering in volatility before being exposed to a high vacuum, thus reducing material losses.

In the polycondensation of polyethylene terephthalate prepolymer, typical reaction temperatures are between about 240 and 320° C. and the range of about 270 to 290° C. is usually preferred. For a single pressure stage operation using the technique of the present invention, the absolute pressure should desirably be within the range of about 0.1 to 2 mm. Hg. In a two-stage process, an initial pressure between about 1 and 20 mm. and a lower final pressure in the range of about 0.1 to 2 mm. are generally suitable. For three-stage operations, the initial zone may be maintained at a pressure between about 30 and 300 mm., the intermediate zone at about 1 to 20 mm. and the final zone at a still lower pressure in the 0.1 to 2 mm. range.

With a constant throughput rate, substantial increases in the intrinsic viscosity of the polyethylene terephthalate product have been obtained by increasing the rotary speed of the screws which indicates that the major portion of the polycondensation reaction takes place at the polymer surface and that the surface exposure during the reaction is a critical variable. The present invention provides an improved physical method and means for governing the polycondensation rate by regulating the rates of surface exposure and renewal in selectively producing products of the desired physical properties.

At low screw speeds (e.g., below about 12 r.p.m.), the surface exposure rate and the residence time of polymer in the reactor are both functions of screw speed and not subject to indenpendent control. However at higher speeds, most of the polymer holdup in the reactor is in the form of films on the screw flights and barrels rather than a pool of bulk polymer, and the residence time remains substantially constant while the screw speeds may be varied to regulate the rate of surface renewal and thereby control the polycondensation rate.

Although the invention has been described in considerable detail in connection with a specific polymerization reaction in one type of reactor, it will be apparent to those skilled in the art that this invention has wide application to other polymerization reactions wherein gaseous material is evolved and also to other processes wherein a gaseous material is transferred to or from the surface of a liquid, as exemplified by the removal of liquid reaction media or solvents from synthetic resins or other plastic materials. The novel technique and equipment are particularly suitable for the treatment of highly viscous materials, especially in cases where the viscosity of the material changes considerably during the treatment. Accordingly, the present invention should not be construed as limited in any particulars except as may be recited in the appended claims or required by the prior art.

We claim:

1. In a continuous process for the polymerization of a viscous polymerizable liquid consisting essentially of polymers of ethylene glycol and terephthalic acid wherein the viscosity of said liquid increases substantially during said polymerization, the improvement which comprises continuously distributing and exposing said liquid at a temperature suitable for polymerization and for the evolution of ethylene glycol vapor in the subatmospheric vapor space of a confined zone as a thin layer of controlled maximum thickness suitable for the release of ethylene glycol evolved during the polymerization of said liquid on the outwardly and oppositely rotating upper surfaces of a pair of substantially horizontal, parallel, closely intermeshed screws extending substantially entirely across said zone, and removing the gaseous ethylene glycol from said vapor space as said liquid is being continuously transported through said zone at a predetermined rate by the counterrotation of said screws while partially immersed in said liquid to a depth not substantially exceeding the radii of said screws wherein the nip clearance between the flights of said intermeshing screws is small enough to produce a wiping action that exposes a fresh surface of said liquid in each individual screw flight emerging from meshing engagement and substantially all surfaces in contact with said liquid within said zone are subjected to a continual wiping action sufficient to prevent any substantial accumulation of stagnant viscous material on said surfaces.

2. A process according to claim 1 in which the subatmospheric pressure in said vapor space is less than about 300 mm. Hg.

3. A process according to claim 1 in which said liquid is subjected to sequential treatments while being transported through a plurality of said confined zones by said intermeshing screws with said zones being sealed against the passage of gaseous material therebetween by substantially completely filling with said liquid at least several of the flights of a longitudinal section of said intermeshing screws rotating within a complete and closely confining peripheral enclosure located between adjacent confined zones.

4. A process according to claim 1 in which treated liquid of high viscosity is discharged from said zone through a restricted outlet at the end of a passageway closely and completely confining the peripheries of flight sections of said screws having a rectangular profile and in which at least several of said confined flights are completely filled with said viscous liquid to seal said passageway against the passage of gaseous material.

5. A process according to claim 1 in which a vapor space for the collection of gaseous material evolved in said zone is provided above said screws and extending over a substantial portion of the upper peripheral surfaces of said screws adjacent the nip of said intermeshing screw flights.

6. A process according to claim 1 in which a uniform residence time within said zone is maintained for substantially all portions of said liquid by confining said liquid substantially within the flights of said screws by a lower wall of the polymerization zone closely confining the lower peripheral surfaces of said screws to prevent both back flow and the stagnation of said liquid.

7. A process according to claim 1 in which an end of said reaction zone is sealed against the passage of gaseous material by substantially completely filling with said liquid at least several flights of a longitudinal section of said intermeshing screws rotating within a complete and closely confining peripheral enclosure.

8. A process according to claim 1 in which said liquid is subjected to sequential treatments while being transported through a plurality of said confined zones by said intermeshing screws with said zones being substantially sealed against the passage of gaseous material therebetween by subtantially completely filling with aid liquid at least several flights of a longitudinal section of said intermeshing screws rotating within a complete and closely confining peripheral enclosure located between adjacent confined zones.

9. A process according to claim 1 in which the charge is polyethylene terephthalate derived from the direct esterification of terephthalic acid with ethylene glycol.

10. A process according to claim 1 in which said condensation is completed in a polymerization zone maintained at an absolute pressure between about 0.1 and 2 mm. of mercury.

11. A process according to claim 9 in which said polyethylene terephthalate is substantially continuously polymerized during passage through a plurality of said polymerization zones arranged in series and maintained at sequentially diminishing pressures.

12. A process according to claim 11 in which said polyethylene terephthalate is substantially continuously polymerized while being transported on screws through at least two of said polymerization zones including a zone maintained at an absolute pressure between about 1 and 20 mm. and a subsequent zone maintained at between about 0.1 and 2 mm. of mercury.

13. A process according to claim 12 in which a polyethylene terephthalate charge derived from the direct esterification of terephthalic acid with ethylene glycol is transported by intermeshing screw flights, ethylene glycol vapor is discharged through a vapor space in each said zone above said screws and extending over a substantial portion of the upper peripheral surfaces of said screws adjacent the nip of the intermeshing screw flights, the residence time within each said zone is maintained substantially constant for all portions of said polyethylene terephthalate by confining said polyethylene terephthalate substantially within the flights of said screws by a lower wall of the reactoin zone in close proximity to the lower peripheral surfaces of said screws to prevent both back flow and the stagnation of said polyethylene terephthalate, and said zones are sealed against the passage of gaseous material therebetween by substantially completely filling with said polyethyelne terephthalate at least several flights of longitudinal sections of said intermeshing screws rotating within complete and closely confining peripheral enclosures located between adjacent confined zones and wherein said screws have a substantially smaller pitch than the pitch of the distribution sections of said screws.

References Cited

UNITED STATES PATENTS

| | | | |
|---|---|---|---|
| 2,758,915 | 8/1956 | Vodonik | 23—285 |
| 3,057,702 | 10/1962 | Pierce et al. | 23—285 |
| 3,343,922 | 9/1967 | Zimmer et al. | 23—285 |
| 3,244,485 | 4/1966 | Coggeshall | 23—260 |

WILLIAM H. SHORT, Primary Examiner

M. GOLDSTEIN, Assistant Examiner

U.S. Cl. X.R.

23—285; 260—96